(12) United States Patent
Usukura et al.

(10) Patent No.: US 7,644,794 B2
(45) Date of Patent: Jan. 12, 2010

(54) MODE CHANGEOVER CONTROL SYSTEM FOR TRANSMISSION IN MOTORCYCLE

(75) Inventors: Yasutaka Usukura, Saitama (JP); Shinji Goto, Saitama (JP); Masahiko Nakatsuka, Saitama (JP); Kazuhiro Takeuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 11/337,587

(22) Filed: Jan. 24, 2006

(65) Prior Publication Data

US 2006/0162979 A1 Jul. 27, 2006

(30) Foreign Application Priority Data

Jan. 24, 2005 (JP) ............................. 2005-016129

(51) Int. Cl.
*B62D 61/02* (2006.01)
(52) U.S. Cl. ..................................... 180/219; 180/218
(58) Field of Classification Search ................. 180/219, 180/218
See application file for complete search history.

(56) References Cited

U.S. PATENT DOCUMENTS

| | | | | |
|---|---|---|---|---|
| 4,693,488 A | * | 9/1987 | Bernocco | .................... 280/293 |
| 4,883,284 A | * | 11/1989 | Nakazawa et al. | .......... 280/293 |
| 6,154,703 A | * | 11/2000 | Nakai et al. | .................. 701/200 |
| 7,140,631 B2 | * | 11/2006 | Ridley | .......................... 280/301 |
| 2001/0041645 A1 | * | 11/2001 | Nanri et al. | .................... 477/68 |
| 2002/0033295 A1 | * | 3/2002 | Korenjak et al. | ............ 180/292 |
| 2005/0103144 A1 | * | 5/2005 | Tatewaki et al. | ........... 74/473.3 |

FOREIGN PATENT DOCUMENTS

| | | |
|---|---|---|
| EP | 0359244 A2 | 3/1990 |
| EP | 0820919 A1 | 1/1998 |
| JP | 07-132755 A | 5/1995 |

* cited by examiner

*Primary Examiner*—Lesley D Morris
*Assistant Examiner*—Tashiana Adams
(74) *Attorney, Agent, or Firm*—Birch, Stewart, Kolasch & Birch, LLP

(57) ABSTRACT

A mode changeover control system for a transmission wherein the starting of a vehicle can be prevented even if the transmission is changed over to the drive mode side while a side stand is in an erected position. In a motorcycle including a mode changeover mechanism for a continuously variable transmission, and a side stand, there is provided a changeover operation section changed over by the driver between operation positions corresponding respectively to a drive mode position and a neutral mode position of the mode changeover mechanism. An electronic control unit operates the mode changeover mechanism based on the changeover operation position of the changeover operation section. The control section is configured so as to continually maintain the mode changeover mechanism in the neutral mode position even if the changeover operation section is operated to a drive mode operation position while the side stand is in a stored position.

15 Claims, 9 Drawing Sheets

| | | | |
|---|---|---|---|
| Drive mode setting switch ON? | YES | | Other than those on the left |
| Neutral mode setting switch ON? | | YES | |
| Throttle valve opening θ = 0%? | YES | YES | |
| Vehicle speed V = 0 km/h? | YES | YES | |
| Engine speed Ne < Nc? (Nc: engine speed for connection of centrifugal clutch) | YES | YES | |
| Side stand in stored position? | YES | YES or NO | |
| Drive motor detecting sensor ON? | | YES | |
| Neutral mode detecting sensor ON? | YES | | |
| Electric motor operation direction | D | N | Present status maintained |
| Display unit | D | N | |

FIG. 7

MODE CHANGEOVER CONTROL SYSTEM FOR TRANSMISSION IN MOTORCYCLE

CROSS-REFERENCE TO RELATED APPLICATIONS

The present application claims priority under 35 USC 119 to Japanese Patent Application No. 2005-016129 filed on Jan. 24, 2005 the entire contents of which are hereby incorporated by reference.

FIELD OF THE INVENTION

The present invention relates to a mode changeover control system for a transmission in a motorcycle including a mode changeover mechanism for changing over the transmission between a drive mode position for establishing a drive mode and a neutral mode position for establishing a neutral mode. A side stand is mounted to a vehicle body wherein the side stand is turned between an erected position for supporting the vehicle body with a front wheel and a rear wheel in a grounded state and a stored position for enabling operation of the vehicle.

DESCRIPTION OF BACKGROUND ART

Such a mode changeover control system for a transmission in a motorcycle as above-mentioned is disclosed Japanese Patent No. 3334976.

In the system disclosed in Japanese Patent No. 3334976, in the case where the side stand is in the erected state, even if the driver sets the transmission into the drive mode and performs an operation for opening the throttle valve, the centrifugal clutch is not connected, since a section for automatically restraining an increase in the engine speed is provided for preventing the vehicle from starting in such a situation. However, the section for automatically restraining the increase in the engine speed in this manner tends to be complicated and expensive.

SUMMARY AND OBJECTS OF THE INVENTION

The present invention has been made in consideration of the above-mentioned circumstances. Accordingly, it is an object of an embodiment of the present invention to provide a mode changeover control system for a transmission in a motorcycle by which the starting of the vehicle can be prevented by maintaining the transmission in a neutral mode even if the driver changes over the transmission to the drive mode side in the case where the side stand is in the erected state. The present invention is simple and inexpensive.

In order to attain the above object, an embodiment of the present invention is directed to a motorcycle including a mode changeover mechanism for changing over a transmission between a drive mode position for establishing a drive mode and a neutral mode position for establishing a neutral mode. A side stand is mounted to a vehicle body wherein the side stand is turned between an erected position for supporting the vehicle body with a front wheel and a rear wheel being in a grounded state and a stored position. A changeover operation section is operated by the driver in a changing-over manner between a drive mode operation position and a neutral mode operation position corresponding, respectively, to the drive mode position and the neutral mode position of the mode changeover mechanism. A control section is provided for operating the mode changeover mechanism based on the changeover operation position of the changeover operation section. The control section is configured so as to maintain the mode changeover mechanism in the neutral mode position even if the changeover operation section is operated from the neutral mode operation position to the drive mode operation position when the side stand is in the stored position.

In addition, an embodiment of the present invention is directed to a recognition section that is provided for letting the driver recognize the condition where the mode changeover mechanism is in the drive mode position or the neutral mode position.

Further, an embodiment of the present invention is directed to the recognition section that is includes a mode display unit provided on a meter panel of the motorcycle so as to display the condition where the mode changeover mechanism is in the drive mode position or the neutral mode position.

Furthermore, an embodiment of the present invention is directed to the mode changeover mechanism that includes an electrically driven actuator operated by an electrical output from the changeover operation section.

Further, an embodiment of the present invention is directed to the control section that is configured so as to maintain the mode changeover mechanism in the neutral mode position, irrespectively of the position of the side stand, even if the changeover operation section is operated from the neutral mode operation position to the drive mode operation position when a throttle vale is opened to or beyond a predetermined opening.

According to an embodiment of the present invention, in the case where the changeover operation section is operated by the driver into the drive mode operation position while the transmission is in the neutral mode, if the side stand is in the erected position, the control section maintains the mode changeover mechanism in the neutral mode position, whereby the vehicle can be prevented from being started. In that case, the configuration for the control section to maintain the mode changeover mechanism in the neutral mode position is comparatively simple, which can contribute to a reduction in the cost of the mode changeover control system for the transmission.

In addition, according to an embodiment of the present invention, in the case where the changeover operation section is operated by the driver into the drive mode operation position while the transmission is in the neutral mode, if the side stand is in the erected position, it is recognized by the driver through the recognition section that the mode changeover mechanism is in the drive mode position, so that the driver can immediately recognize that he has forgotten to store the side stand, even if an operation of opening the throttle valve is not conducted.

According to an embodiment of the present invention, in the case where the driver has forgotten to store the side stand and the changeover operation section is operated by the driver into the drive mode operation position while the transmission is in the neutral mode, the driver can appropriately recognize, by looking at the mode display unit, that he has forgotten to store the side stand, so that a needless vehicle starting operation can be prevented.

Further, according to an embodiment of the present invention, the actuator can be electrically controlled, and a changeover operation of the mode changeover mechanism can be performed quickly and appropriately.

Furthermore, according to an embodiment of the present invention, even in the case where the side stand has been stored by the driver and the changeover operation section is operated by the driver into the drive mode position while the transmission is in the neutral mode, if the throttle valve has been opened to or beyond a predetermined opening, the control section maintains the mode changeover mechanism in the neutral mode position, so that the connection of a vehicle starting clutch under a high engine speed condition is restrained. Thus, a smooth vehicle starting can be achieved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a truth table for the control of the operation of the mode changeover mechanism;

DETAILED DESCRIPTION OF THE PREFERRED EMBODIMENTS

Now, a mode for carrying out the present invention will be described below, based on the embodiments of the invention shown in the accompanying drawings.

Figure 1:
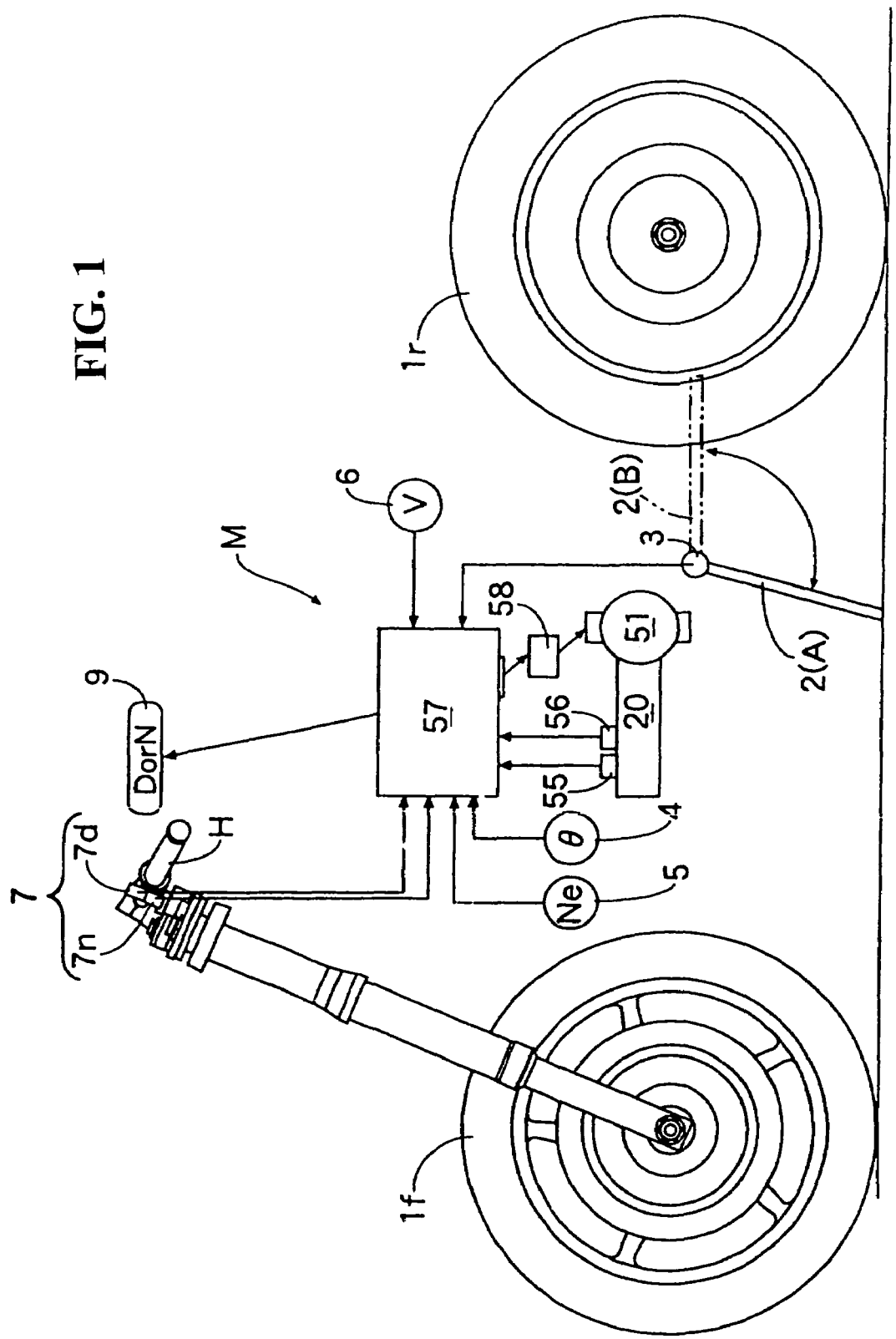
FIG. 1 is a side view of a motorcycle including a mode changeover control system for a transmission according to a first embodiment of the present invention.
Figure 2:
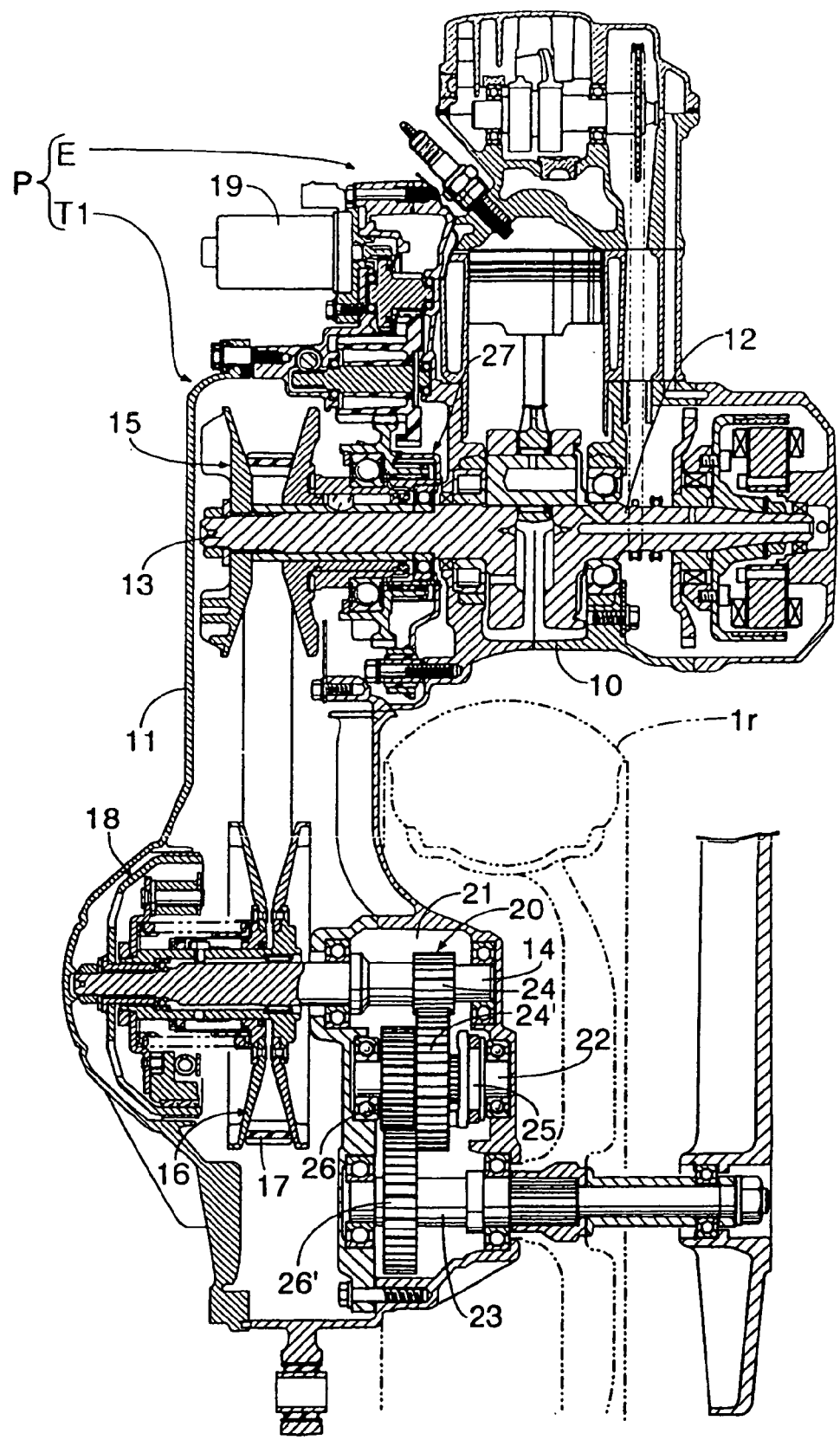
FIG. 2 is a longitudinally sectional plan view of a power unit of the motorcycle.

FIGS. 1 to 7 are directed to a first embodiment of the present invention wherein FIGS. 1 and 2, illustrate a power unit P for a motorcycle M that includes an engine E, and a belt type continuously variable transmission T1 for transmitting the power of the engine E to a rear wheel 1$r$. In addition, a side stand 2 is mounted to the vehicle body that is turned by the driver between an erected position A for supporting a vehicle body of the motorcycle M in an erected state with a front wheel 1$f$ and the rear wheel 1$r$ in a grounded state and a stored position B for enabling operation of the vehicle. A side stand sensor 3 is provided for detecting the erected position A and the stored position B of the side stand 2 is provided in the vehicle body.

In addition, the engine E is equipped with a throttle sensor 4 for detecting that the opening θ of a throttle valve of the engine E is θ≈0%, a vehicle speed sensor 6 for detecting the vehicle speed V is V≈0 km/h, and an engine speed sensor 5 for detecting that the engine speed Ne is less than the engine speed Nc for starting the connection of a centrifugal clutch 18 which will be described later, i.e., Ne<Nc.

Further, in the vicinity of a grip of a steering handle H of the motorcycle M, there is provided a drive mode setting switch 7$d$ and a neutral mode setting switch 7$n$ which are operated by the driver for changing over the mode of the continuously variable transmission T1. Furthermore, a mode display unit 9 for displaying the mode of the continuously variable transmission T1 is provided in a meter panel of the motorcycle M, for displaying "D" when the continuously variable transmission T1 is in the drive mode and displaying "N" when the continuously variable transmission T1 is in the neutral mode. The drive mode setting switch 7$d$ and the neutral mode setting switch 7$n$ constitute a changeover operation section 7.

The continuously variable transmission T1 will be described referring to FIG. 2. The continuously variable transmission T1 includes a transmission case 11 provided in connection with one side of a crankcase 10 of the engine E, an input shaft 13 formed as one body with an end portion of a crankshaft 12 of the engine E and disposed at a front portion of the inside of the transmission case 11, and an output shaft 14 supported at a rear portion of the inside of the transmission case 11 in parallel to the input shaft 13. The continuously variable transmission T1 further includes a variable-diameter drive pulley 15 mounted to the input shaft 13, a variable-diameter driven pulley 16 relatively rotatably mounted to the output shaft 14, a belt 17 wrapped around the drive pulley 15 and driven pulley 16, and the centrifugal clutch 18 for connection between the driven pulley 16 and the output shaft 14 in response to the driven pulley 16 being rotated at or above a predetermined rotating speed. A screw mechanism 27, for varying the effective diameter of a movable pulley half of the drive pulley 15, is connected to the movable pulley half. A speed change electric motor 19, for driving the screw mechanism 27, is mounted to the transmission case 11. The rear wheel 1$r$ is connected to the output shaft 14 through a mode changeover mechanism 20.

The power of the engine E outputted from the crankshaft 12 is transmitted from the input shaft 13 through the drive pulley 15 and the belt 17 to the driven pulley 16. When the rotating speed of the driven pulley 16 exceeds a predetermined value, the centrifugal clutch 18 is put into an ON state, to make a connection between the driven pulley 16 and the output shaft 14, so that the power transmitted to the driven pulley 16 is transmitted through the centrifugal clutch 18 to the output shaft 14, then to the mode changeover mechanism 20, and to the rear wheel 1$r$.

The mode changeover mechanism 20 will be described referring to FIGS. 2 to 6.

Figure 3:
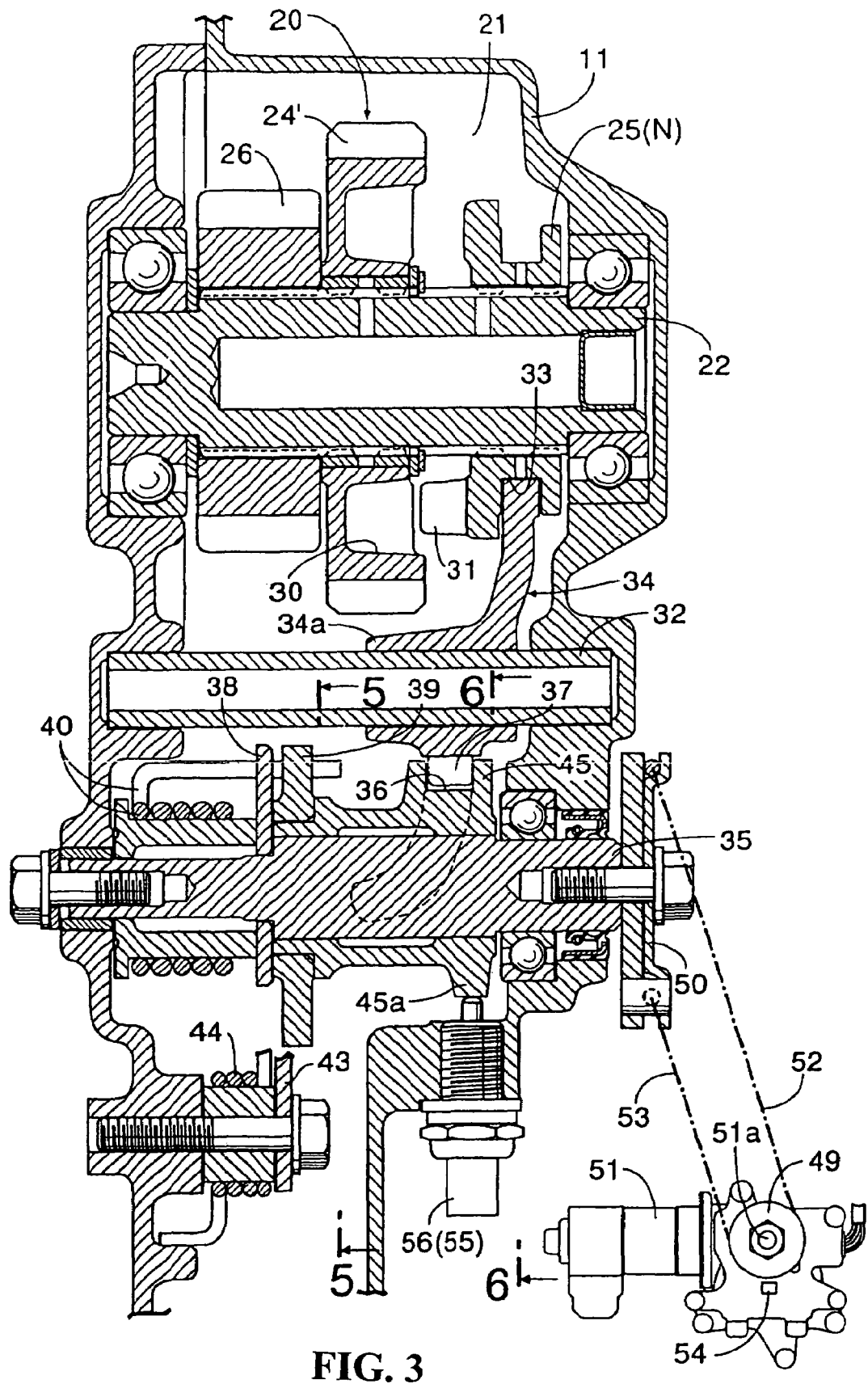
FIG. 3 is a longitudinally sectional plan view of a mode changeover mechanism of a continuously variable transmission in the power unit, in a neutral mode.
Figure 4:
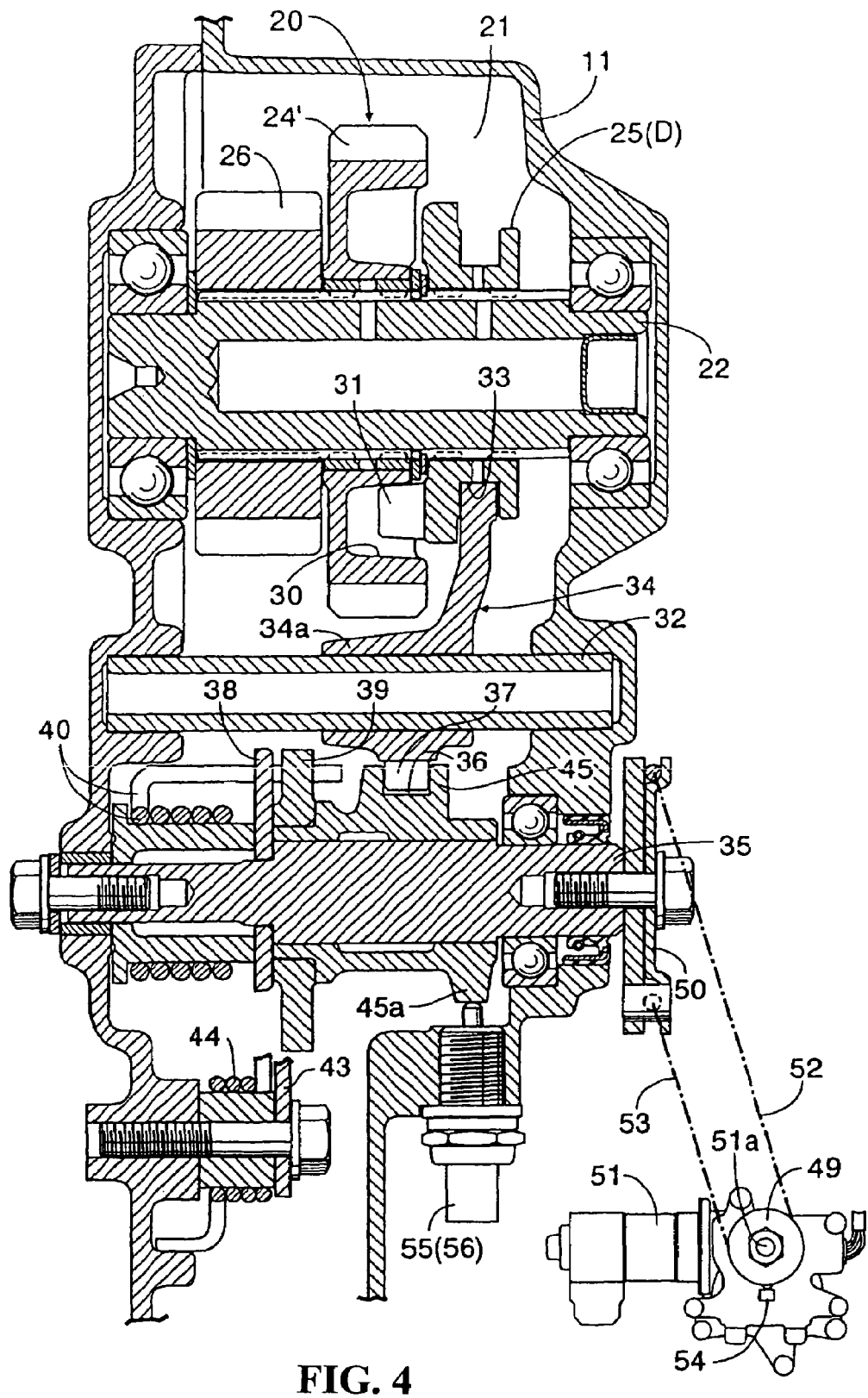
FIG. 4 is a longitudinally sectional plan view of the mode changeover mechanism, in a drive mode.

As shown in FIGS. 2 to 4, a reduction chamber 21 is formed on one side of a rear portion of the inside of the transmission case 11, and the mode changeover mechanism 20 is disposed in the chamber 21. The mode changeover mechanism 20 includes an intermediate shaft 22 supported turnably on the transmission case 11 and in parallel to the output shaft 14. A drive shaft 23 is also supported turnably on the transmission case 11 and in parallel to the intermediate shaft 22. A primary drive gear 24 is spline connected to an end portion, projecting into the reduction chamber 21, of the output shaft 14 with a primary driven gear 24' being rotatably borne on the intermediate shaft 22 and meshed with the primary drive gear 24. A dog clutch member 25 is slidably spline connected to the intermediate shaft 22 adjacent to one side of the primary driven gear 24'. The mode changeover mechanism 20 further includes a secondary drive gear 26 spline connected to the intermediate shaft 22 mounted adjacent to the other side of the primary driven gear 24', and a secondary driven gear 26' spline connected to the drive shaft 23. A speed reduction is driven by the secondary drive gear 26. The rear wheel 1r is mounted to an outer end portion, projecting to the outside of the transmission case 11, of the drive shaft 23 so as to be rotated together with the drive shaft 23.

The primary driven gear 24' is provided on its one side surface with a plurality of connection holes 30, 30 . . . , and the dog clutch member 25 can be slid on the intermediate shaft 22 so that a plurality of dog claws 31, 31 . . . projecting on one side surface thereof are engaged with and disengaged from the connection holes 30, 30 . . . .

When the dog clutch member 25 is shifted into a drive mode position D for its dog claws 31, 31 . . . to be engaged with the connection holes 30, 30 . . . of the primary driven gear 24', the power of the output shaft 14 is transmitted through the primary drive gear 24, the primary driven gear 24', the dog clutch member 25, the intermediate shaft 22, the secondary drive gear 26, and the secondary driven gear 26' to the drive shaft 23, thereby driving the rear wheel 1r. This condition is the drive mode of the continuously variable transmission T1. When the dog clutch member 25 is put into a neutral mode position N for its dog claws 31, 31 . . . to be disengaged from the connection holes 30, 30 . . . of the primary driven gear 24', power is not transmitted from the continuously variable transmission T1 to the rear wheel 1r. This condition is the neutral mode of the continuously variable transmission T1.

Figure 5:
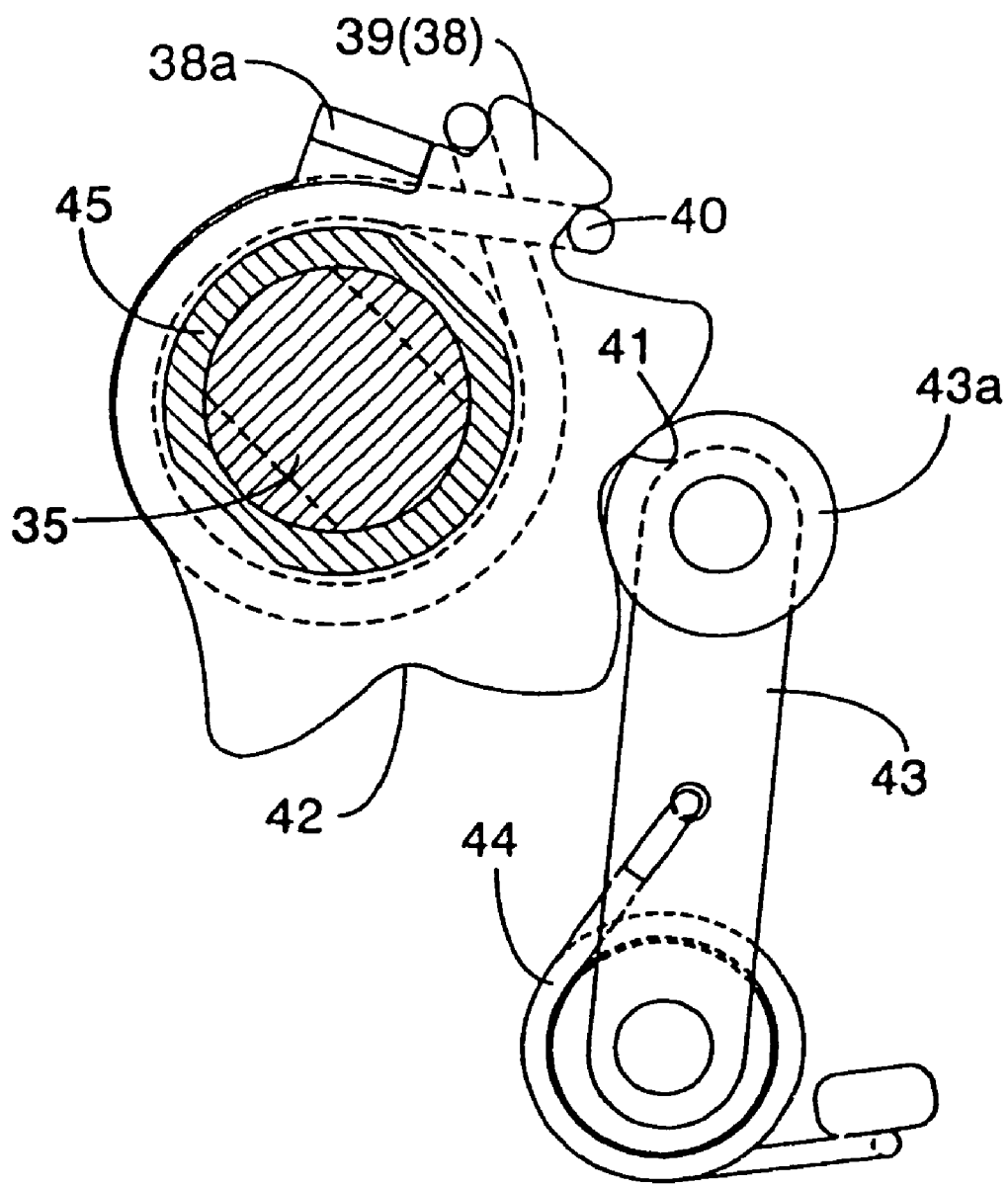
FIG. 5 is a sectional view along line 5-5 of FIG. 3.

As shown in FIGS. 3 to 5, in the reduction chamber 21, a shifter shaft 32 that is parallel to the intermediate shaft 22 is supported on the transmission case 11 with a boss 34a of a shift fork 34 having a fork portion engaged with an annular groove 33 formed at an outer periphery of the dog clutch member 25 being slidably mounted to the shifter shaft 32. Further, in the reduction chamber 21, a drum shaft 35 that is parallel to the shifter shaft 32 is rotatably supported on the transmission case 11. A driven pin 37 projecting from the outer peripheral surface of the boss 34a of the shift fork 34 is engaged with a cam groove 36 formed in the outer periphery of a shift drum 45 rotatably mounted to the drum shaft 35. With the shift drum 45 reciprocally turned, it is possible to move the shift fork 34 in the left-right direction by a guiding action of the cam groove 36 through the driven pin 37 as shown in FIGS. 3 and 4, and thereby to shift the dog clutch member 25 into the drive mode position D or the neutral mode position N.

A drive arm 38 adjacent to one end face of the shift drum 45 is firmly attached to the drum shaft 35. A driven arm 39 mounted adjacent to the drive arm 38 in a relatively turnable manner is firmly attached to the shift drum 45. A lost motion spring 40 composed of a torsion coil spring for clampingly pressing the drive and driven arms 38 and 39 in the turning direction thereof is mounted to the drum shaft 35.

The outer peripheral surface of the driven arm 39 is provided with first and second detent notches 41 and 42 arranged side by side in the circumferential direction. A detent arm 43, provided at its tip end with a roller 43a capable of being engaged sequentially with the detent notches 41 and 42, is swingably shaft-supported on the transmission case 11. A detent spring 44 for biasing the detent arm 43 toward the side of the detent notches 41, 42 is connected to the detent arm 43. When the shift drum 45 is in a position corresponding to the drive mode position D of the dog clutch member 25, the roller 43a is springily engaged with the first detent notch 41. When the shift drum 45 is in a position corresponding to the neutral mode position N of the dog clutch member 25, the roller 43a is springily engaged with the second detent notch 42, whereby the shift drum 45 is stably held in each of these positions.

A driven drum 50 is firmly attached to the one end portion, projecting to the outside of the transmission case 11, of the drum shaft 35, and a drive drum 49 is firmly attached to an output shaft 51a of a speed-reducer electric motor 51 disposed at an appropriate portion of the vehicle body of the motorcycle M. First and second wires 52 and 53 for transmitting the normal rotation and the reverse rotation of the drive drum 49 to the driven drum 50 are connected to the drive drum 49 and the driven drum 50.

By the normal rotation of the electric motor 51, the first wire 52 is pulled through the drive drum 49, the driven drum 50 is rotated normally, the shift drum 45 is rotated in such a direction so as to move the shift fork 34 to the left side in FIG. 3 through the drum shaft 35, the drive arm 38, the lost motion spring 40 and the driven arm 39, and the dog clutch member 25 is shifted from the neutral mode position N to the drive mode position D in FIG. 4. On the other hand, by the reverse rotation of the electric motor 51, the second wire 53 is pulled through the drive drum 49, whereby the driven drum 50, the drum shaft 35 and the drive arm 38 are reversely rotated by predetermined angles, whereupon a return claw 38a of the drive arm 38 directly pushes the driven arm 39 in the reverse rotation direction, so that the shift drum 45 is immediately rotated reversely, and the dog clutch member 25 is returned to the neutral mode position N in FIG. 3 through the shift fork 34.

In FIGS. 3 and 4, on the outside surface of the transmission case 11, there is disposed a limit switch 54 operated when the driven drum 50 is rotated by an angle sufficient for shifting the dog clutch member 25 from the neutral mode position N to the drive mode position D. An operation signal of the limit switch 54 is utilized as a signal for stopping the normal rotation of the electric motor 51.

Figure 6:
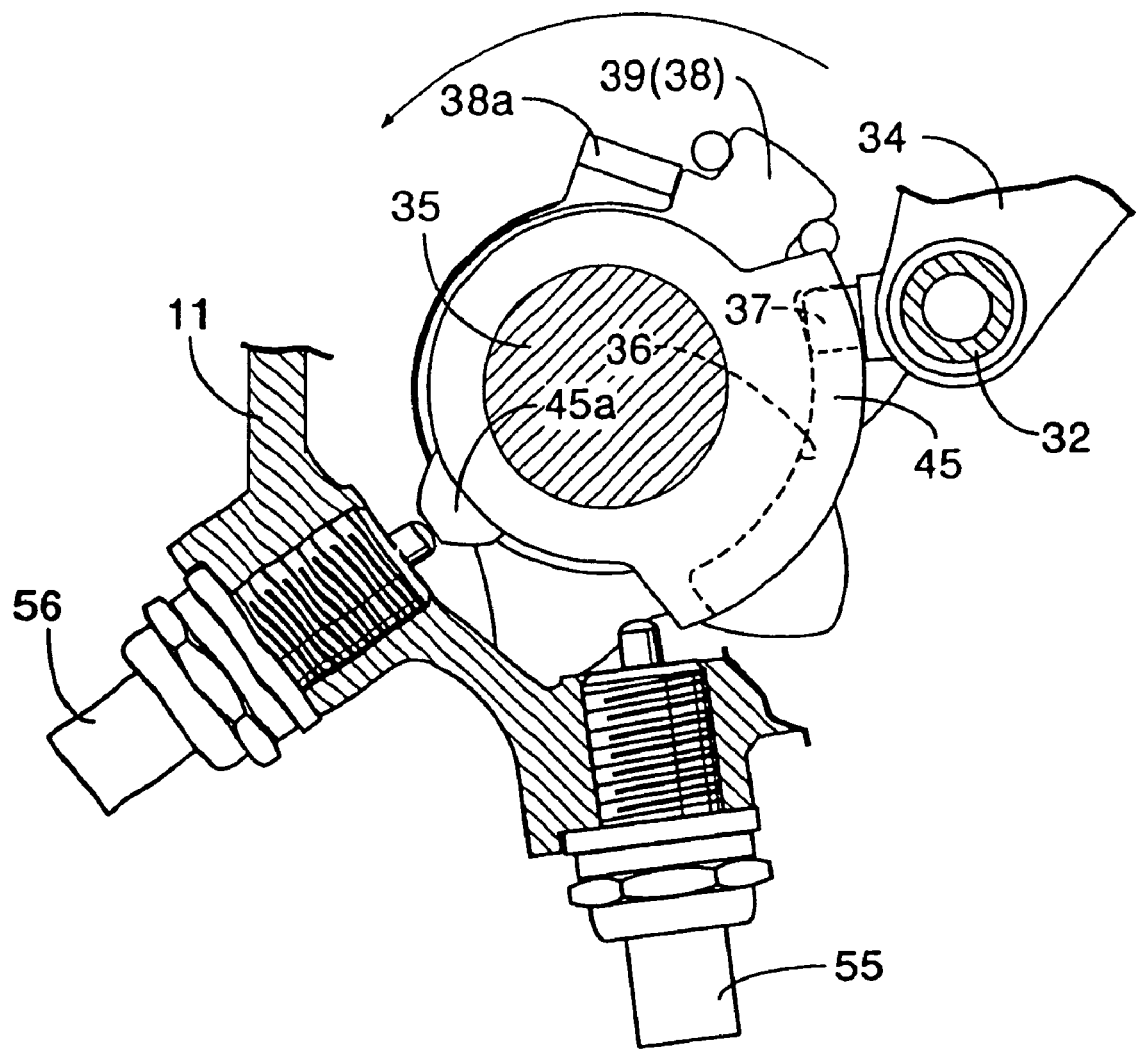
FIG. 6 is a sectional view along line 6-6 of FIG. 3.

In FIGS. 3, 4 and 6, a drive mode detecting sensor 55 for detecting the drive mode position D of the dog clutch member 25 from the position of a projection 45a by projecting from the outer peripheral surface of the shift drum 45 when the shift drum 45 is in a position corresponding to the drive mode position D of the dog clutch member 25, and a neutral mode detecting sensor 56 for detecting the neutral mode position N of the dog clutch 25 from the position of the projection 45a when the shift drum 45 is in a position corresponding to the neutral mode position N of the dog clutch member 25, are mounted to the transmission case 11.

As illustrated in FIG. 1, the electric motor 51 is rotated normally and reversely by being supplied with electric current by the electronic control unit 57 through a normal/reverse rotation control relay 58. The electronic control unit 57 is supplied with detection signals from the throttle sensor 4, the vehicle speed sensor 6, the engine speed sensor 5 and the side stand sensor 3, output signals from the drive mode setting switch 7d and the neutral mode setting switch 7n, and output signals from the drive mode detecting sensor 55 and the neutral mode detecting sensor 56.

Upon receiving inputs of the above-mentioned signals, the electronic control unit 57 controls the passing of electric current to the electric motor 51 and output mode signals to the mode display unit 9, based on the truth table shown in FIG. 7.

Now, the operations in the first embodiment will be described below.

In the case where the drive mode setting switch 7d is put into the ON state by the driver while the continuously variable transmission T1 is in the neutral mode, the electronic control unit 57 passes an electric current for normal rotation to the electric motor 51 through the normal/reverse rotation control relay 58 only when it is judged from the above-mentioned various input signals that the throttle valve opening θ≈0%, the vehicle speed V≈0 km/h, the engine speed Ne<Nc (the engine speed for connection of the centrifugal clutch 18), that the side stand 2 is in the stored position B, and that the neutral mode detecting sensor 56 is ON. As a result, the electric motor 51 is rotated normally, the driven drum 50 and the drum shaft 35 are rotated normally through the first wire 52, and the shift drum 45 is rotated in a direction for moving the shift fork 34 leftwards in FIG. 3 through the drum shaft 35, the drive arm 38, the lost motion spring 40 and the driven arm 39. With the shift fork 34 moved leftwards, the dog clutch member 25 is shifted into the drive mode position D, whereby the dog claws 31, 31 . . . of the dog clutch member 25 can be engaged with the connection holes 30, 30 . . . of the primary driven gear 24', as shown in FIG. 4.

When the normal rotation angle of the driven drum 50 reaches an angle sufficient for shifting the dog clutch member 25 to the drive mode position D, the operation of the limit switch 54 is detected by the electronic control unit 57, and the normal rotation of the electric motor 51 is stopped.

In the case where the dog pawls 31, 31 . . . of the dog clutch member 25 are not engaged with the connection holes 30, 30 . . . but abut on the side surface of the primary driven gear 24', the driven arm 39 becomes non-rotatable at an intermediate position, the drive arm 38 is turned precedently to the driven arm 39 while deflecting the lost motion spring 40. On the other hand, by the rotation of the driven arm 39 until the stoppage at the intermediate position, the roller 43a of the detent arm 43 escapes from a first detent notch 41 of the driven arm 39 against the springy force of the detent spring 44, and is stopped upon coming to an inclined surface of the adjacent second detent notch 42. Therefore, even when the drive force for normal rotation of the electric motor 51 is lost, the driven arm 39 is energized in the normal rotation direction by an engaging force for engaging the roller 43a with the second detent notch 42 by the detent spring 44 and the repelling force of the lost motion spring 40. Accordingly, when the positions of the connection holes 30, 30 . . . and the positions of the dog claws 31, 31 . . . coincide with each other, the driven arm 39 and the shift drum 45 are rotated normally by the repelling force of the lost motion spring 40, whereby the dog clutch member 25 can be assuredly shifted to the drive mode position D.

The use of the output signal from the limit switch 54 for detecting a predetermined normal rotation angle of the driven drum 50 as a signal for stopping the normal rotation of the electric motor 51 is for obviating as much as possible the passage of an overcurrent to the electric motor 51 in the case where the dog claws 31, 31 . . . of the dog clutch member 25 are not engaged with the connection holes 30, 30 . . . but abut on the side surface of the primary driven gear 24'.

When the shift drum 45 shifts the shift fork 34 to the drive mode position, this condition is detected by the drive mode detecting sensor 55, and the detection signal therefrom is inputted to the electronic control unit 57, so that the electronic control unit 57 displays symbol "D" indicating this condition at the mode display unit 9.

Thus, the continuously variable transmission T1 is put into the drive mode, and the power of the output shaft 14 can be transmitted to the rear wheel 1r, so that the vehicle starting is possible, and the driver can confirm this drive mode from the symbol "D" displayed at the mode display unit 9.

Similarly, even in the case when the drive mode setting switch 7d is turned ON by the driver while the continuously variable transmission T1 is in the neutral mode, if the side stand 2 is in the erected position A, the electronic control unit 57 does not start the electric motor 51 but maintains the mode changeover mechanism 20 in the neutral mode, so that starting of the vehicle can be prevented. In this case, the configuration for the electronic control unit 57 to maintain the mode changeover mechanism 20 in the neutral mode is comparatively simple, which can contribute to a reduction in the cost of the mode changeover control system for the transmission.

In this case, moreover, symbol "N" is continuously displayed at the mode display unit 9 according to the detection signal from the neutral mode detecting sensor 56, so that the driver can immediately recognize that he has forgotten to store the side stand 2, since the symbol displayed at the mode display unit 9 remains "N," notwithstanding he has turned ON the drive mode setting switch 7d. Then, the driver may turn the side stand 2 into the stored position B and may again turn ON the drive mode setting switch 7d, whereby the electric motor 51 can be rotated normally to put the continuously variable transmission T1 into the drive mode, and smooth vehicle starting can be achieved.

Similarly, even in the case where the drive mode setting switch 7d is turned ON by the driver while the continuously variable transmission T1 is in the neutral mode and where the side stand 2 is in the stored position B, if the throttle valve is opened (θ>0%) or the motorcycle M is moving (V>0 km/h) or the engine speed is in excess of the engine speed for starting connection of the centrifugal clutch 18 (Ne>Nc), the electronic control unit 57 does not start the electric motor 51 and continues displaying the symbol "N" at the mode display unit 9, so that the connection of the centrifugal clutch 18 under a high engine speed condition is restrained, and smooth vehicle starting can be achieved.

On the other hand, in the case where the neutral mode setting switch 7n is turned ON by the driver while the continuously variable transmission T1 is in the drive mode, i.e., while the dog clutch member 25 is in the drive mode position D of being connected to the primary driven gear 24', the electronic control unit 57 passes an electric current for reverse rotation to the electric motor 51 through the normal/reverse rotation control relay 58, irrespectively of whether the side stand 2 is in the erected state or the stored state, only when it is judged from the above-mentioned various input signals that the throttle valve opening θ≈0%, that the vehicle speed V≈0 km/h, the engine speed Ne<Nc (the engine speed for connection of the centrifugal clutch 18), and that the drive mode detecting sensor 55 is ON. As a result, the electric motor 51 is rotated reversely, the second wire 53 is pulled through the drive drum 49, whereby the driven drum 50, the drum shaft 35 and the drive arm 38 are rotated reversely by predetermined angles, and this time the return claw 38a formed on the drive arm 38 directly pushes the driven arm 39 in the reverse rotation direction, so that the shift drum 45 can immediately be rotated reversely to return the dog clutch member 25 into the neutral mode position N through the shift fork 34. Then, the neutral mode detecting sensor 56 inputs a detection signal to the electronic control unit 57, so that the electronic control unit 57 stops the passage of electric current to the electric motor 51 and displays the symbol "N" at the mode display unit 9.

Meanwhile, while the mode changeover mechanism 20 is in the neutral mode, even if the racing of the engine E is attended by the centrifugal clutch 18 being put into the connected state and the power of the engine E being transmitted to the output shaft 14, the power cannot be transmitted to the drive shaft 23, so that there is no fear of starting of the vehicle. Accordingly, the racing of the engine E for the purpose of maintenance or the like can be freely performed.

Now, a second embodiment of the present invention shown in FIGS. 8 and 9 will be described below.

In the second embodiment, a continuously variable transmission T2 is configured in a hydrostatic system. Specifically, the hydrostatic continuously variable transmission T2 is composed of a fixed displacement swash plate type hydraulic pump 61, a variable displacement swash plate type hydraulic motor 62, and a hydraulic closed circuit 85 for connection between the hydraulic pump 61 and the hydraulic motor 62. The hydraulic pump 61 is composed of an input tubular shaft 63 rotatably borne on the transmission case 11, a pump cylinder 64 relatively rotatably borne on the input tubular shaft 63, a plurality of pump plungers 66, 66 . . . slidably fitted respectively in a plurality of pump cylinder bores 65, 65 . . . provided in the pump cylinder 64 in an annular arrangement pattern so as to surround the rotational axis of the pump cylinder 64, and a pump swash plate 67 relatively rotatably supported on the input tubular shaft 63 with its front surface abutting on the outer ends of the pump plungers 66, 66 . . . .

An input gear 69 to be meshed with a drive gear 68 firmly attached to the engine crankshaft is fixed to the outer periphery of the input tubular shaft 63.

At the time of rotation of the input tubular shaft 63 by the power of the engine E, the pump swash plate 67 can give reciprocal motions to the pump plungers 66, 66 . . . , whereby suction and discharge strokes can be repeated.

On the other hand, the hydraulic motor 62 is composed of a motor cylinder 71 disposed coaxially with and on the right side of the pump cylinder 64 and rotatably borne on the transmission case 11, a plurality of motor plungers 73, 73 . . . slidably fitted respectively in a plurality of motor cylinder bores 72, 72 . . . provided in the motor cylinder 71 in an annular arrangement pattern so as to surround the rotational axis of the motor cylinder 71, a motor swash plate 74 having its front surface abutting on the outer ends of the motor plungers 73, 73 . . . , a motor swash plate holder 75 for rotatably bearing the motor swash plate 74, and a motor swash plate anchor 76 for bearing the back surface of the motor swash plate holder 75. The motor swash plate anchor 76 is fixed to the transmission case 11.

Contacting opposed surfaces 75a and 76a of the motor swash plate holder 75 and the motor swash plate anchor 76 are each formed as a hemispherical surface centered on a trunnion axis 77 orthogonal to the axis of the motor cylinder 71 so that the motor swash plate holder 75 can be inclined around the trunnion axis 77. A speed change lever 78 projects from the outer peripheral surface of the motor swash plate holder 75, and a speed change actuator 79 for inclining the motor swash plate 74 through the motor swash plate holder 75 is connected to the speed change lever 78.

When expansion and contraction strokes are repeated by reciprocating the motor plungers 73, 73 . . . in the condition where the motor swash plate 74 is inclined, the motor cylinder 71 can be rotated through the motor swash plate 74. When the motor swash plate 74 is inclined, the stroke of the motor plungers 73, 73 . . . is varied, whereby the displacement of the hydraulic motor 62 can be varied.

The pump cylinder 64 and the motor cylinder are integrally connected to each other to constitute a cylinder block 80, and an output shaft 81 penetrating through the cylinder block 80 is spline connected to a central portion of the cylinder block 80.

Between the pump cylinder 64 and the motor cylinder 71, the cylinder block 80 is formed with an annular low-pressure oil passage 85L surrounding the output shaft 81, and an annular high-pressure oil passage 85H surrounding the low pressure oil passage 85L, and is provided with a distribution valve mechanism 87 for alternately changing over the communications of the low-pressure and high-pressure oil passages 85L and 85H with inner end portions of the pump cylinder bores 65, 65 . . . and the motor cylinder bores 72, 72 . . . according to the rotational position of the cylinder block 80. The low-pressure and high-pressure oil passages 85L and 85H constitute the above-mentioned closed circuit 85.

Between the hydraulic pump 61 and the hydraulic motor 62, oil pressure is transferred through the low-pressure oil passage 85L, the high-pressure oil passage 85H and the distribution valve mechanism 87, and the power of the engine E can be transmitted from the hydraulic pump 61 to the hydraulic motor 62 through the oil pressure. In addition, speed change can be achieved by varying the displacement of the hydraulic pump 61 through inclining the motor swash plate 74.

Figure 8:
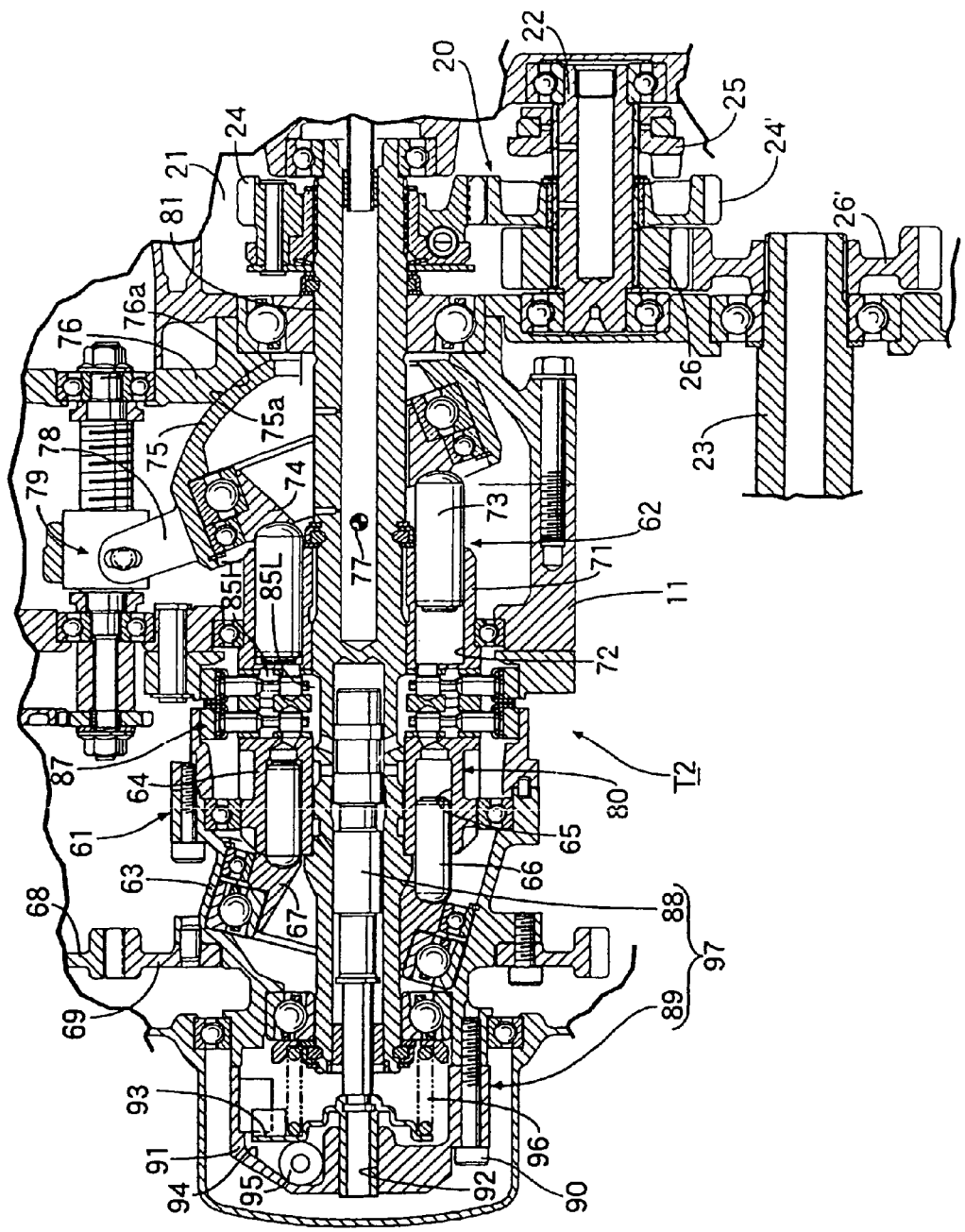
FIG. 8 is a longitudinally sectional plan view of a continuously variable transmission of a motorcycle showing a second embodiment of the present invention.
Figure 9:
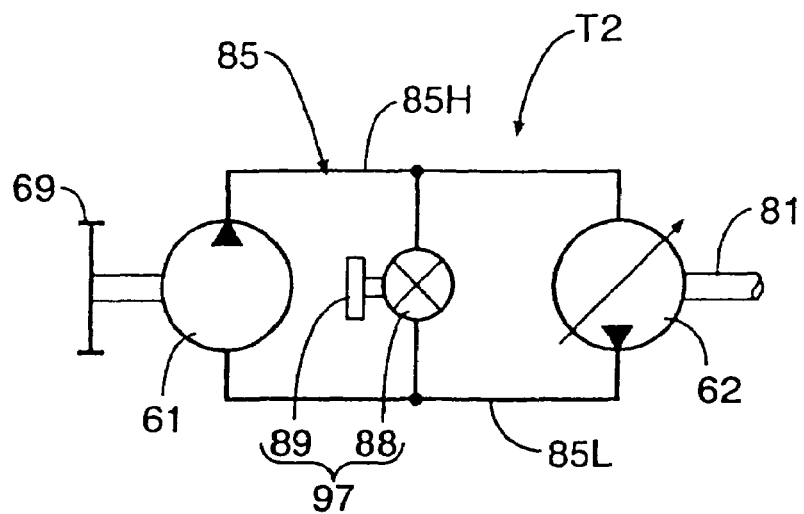
FIG. 9 is a hydraulic circuit diagram of the continuously variable transmission.

A spool type clutch valve 88 capable of sliding in the left-right direction in FIG. 8 is disposed at the center of the output shaft 81. The clutch valve 88 is designed so as to make a short circuit between the low-pressure oil passage 85L and the high-pressure oil passage 85H when being at a left position and to cancel the short circuit between the low-pressure oil passage 85L and the high-pressure oil passage 85H when being at a right position.

A centrifugal mechanism 89 is connected to an outer end portion, projecting to the outside of the output shaft 81, of the clutch valve 88. The centrifugal mechanism 89 includes a rotatable housing 91 firmly attached to the input tubular shaft 63 by a bolt 90 and rotated together with the input tubular shaft 63, and an operating plate 93 of the rotatable housing 91 slidably borne in a guide hole 92 coaxial with the output shaft 81. The outer end portion of the clutch valve 88 is connected to the operating plate 93. A portion, opposed to the operating plate 93, of the rotatable housing 91 is formed with a plurality of wedge surfaces 94 (in FIG. 8, one wedge surface is shown) inclined radially outwards so as to approach the operating plate 93, and a roller form centrifugal pendulum 95 is inserted between the wedge surfaces 94 and the operating plate 93. In addition, a return spring 96 for biasing the operating plate 93 to the wedge surfaces 94 side with a predetermined set load is contained in the rotatable housing 91. The centrifugal mechanism 89 and the clutch valve 88 constitute an automatic vehicle starting clutch 97.

At the time of idling of the engine, the rotating speed of the input tubular shaft 63 and the rotatable housing 91 is low, so that the clutch valve 88 is held in the left position, i.e. clutch OFF position, by the set load of the return spring 96 through the operating plate 93, whereby a short circuit is made between the low-pressure oil passage 85L and the high-pressure oil passage 85H. Therefore, transmission of power by hydraulic pressure from the hydraulic pump 61 to the hydraulic motor 62 is not performed.

When the engine speed of the engine E is gradually raised and the rotating speed of the input tubular shaft 63 and the rotatable housing 91 reaches or exceeds a predetermined rotating speed, the centrifugal pendulum 95 starts climbing the wedge surfaces 94 of the rotatable housing 91 under an increasing centrifugal force, and, concurrently, pushes the operating plate 93 to the right against the set load of the return spring 96. Therefore, the clutch valve 88 is also gradually moved to the right by the operating plate 93, whereby the short circuit between the low-pressure oil passage 85L and the high-pressure oil passage 85H is gradually canceled, i.e., canceled through a half clutch condition, and the short circuit between the oil passages 85L and 85H is completely canceled when the clutch valve 88 reaches a clutch ON position on the right side. In this manner, the transmission of power by hydraulic pressure between the hydraulic pump 61 and the hydraulic motor 62 is smoothly started.

The mode changeover mechanism 20 is connected to the output shaft 81. Since the mode changeover mechanism 20 and other controllers have the same configurations as in the first embodiment, in FIG. 8, the portions corresponding to those in the first embodiment are denoted by the same reference symbols as used above, and descriptions thereof are omitted.

In this second embodiment, also, the same effects as those in the first embodiment can be achieved.

Figure 10:
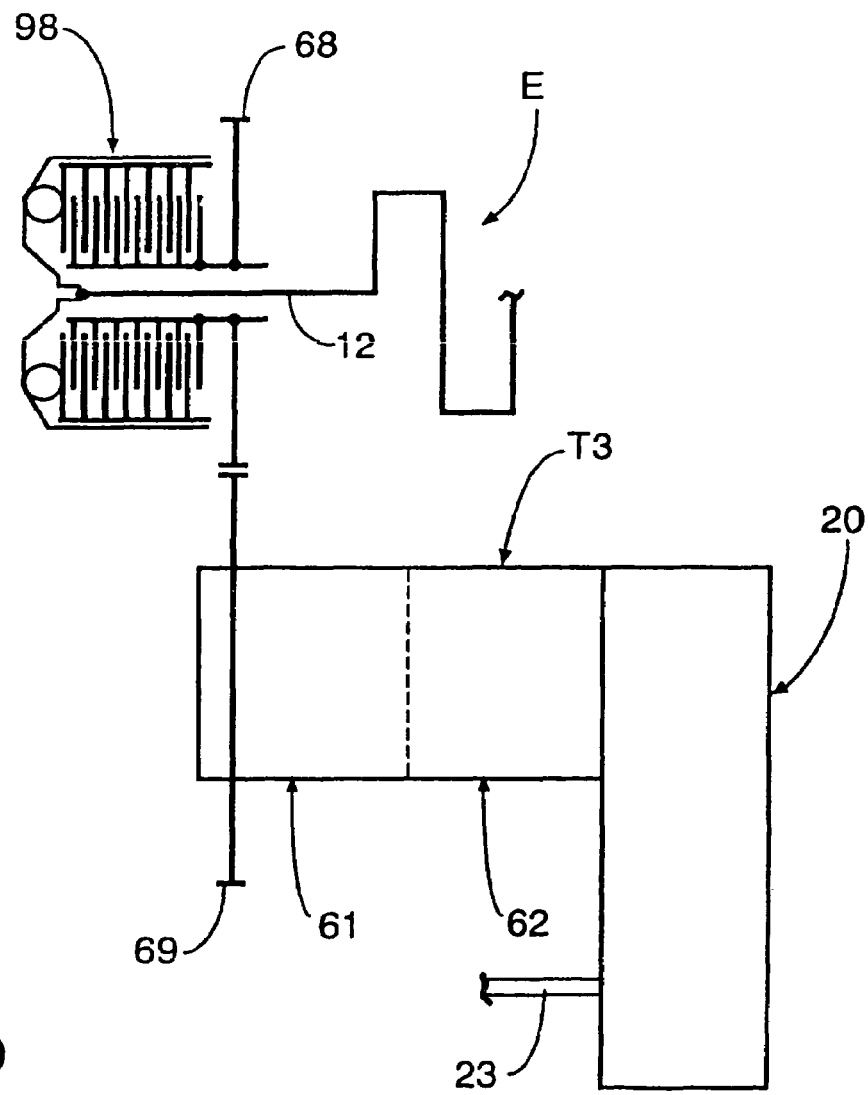
FIG. 10 is a longitudinally sectional plan view of a continuously variable transmission of a motorcycle showing a third embodiment of the present invention.

Finally, a third embodiment of the present invention shown in FIG. 10 will be described.

In the third embodiment, in place of the automatic vehicle starting clutch 97 using the clutch valve 88 in the second embodiment, a known multiple disk type centrifugal clutch 98 is interposed between the crankshaft 12 of the engine E and the drive gear 68 for driving a hydrostatic type continuously variable transmission T3. The other configurations are the same as in the second embodiment, so that, in FIG. 10, the portions corresponding to those in the second embodiment are denoted by the same reference symbols as used above, and descriptions thereof are omitted.

In the third embodiment, also, the same effects as in the first embodiment can be achieved.

While the embodiments of the present invention have been described above, the present invention is not limited to the above embodiments, and various design modifications are possible within the gist of the invention.

For example, in the first embodiment, as a section for stopping the normal rotation of the electric motor 51, there may be used a technique in which the electric current flowing in the electric motor 51 is monitored by the electronic control unit 57, and the passage of the electric current to the electric motor 51 is stopped when the monitored current is rapidly increased attendant on an increase in the load due to the stoppage of the movement of the dog clutch member 25 toward the drive mode position D side. In addition, in the case where the limit switch 54 is adopted as the section for stopping the normal rotation of the electric motor 51, the electronic control unit 57 may display symbol "D" at the mode display unit 9 based on a signal generated by the limit switch 54; in that case, it is possible to discard the drive mode detecting sensor 55.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mode changeover control system for a transmission in a motorcycle comprising:
    an electronic control unit;
    a mode changeover mechanism;
    a changeover operation section; and
    a sensor capable of determining whether a side stand of the motorcycle is in an erected position or a stored position,
    wherein the electronic control unit operates with each of the mode changeover mechanism, the changeover operation section, and the sensor;
    wherein the mode changeover mechanism includes an electronically driven actuator which communicates with the electronic control unit in order to change over a continuously variable transmission between a drive mode position for establishing a drive mode and a neutral mode position for establishing a neutral mode;
    wherein the side stand is mounted on the motorcycle, and is turnable between the erected position for supporting said motorcycle, with a front wheel and a rear wheel in a grounded state, and the stored position for enabling operation of the motorcycle,
    wherein the sensor communicates to the electronic control whether the side stand is in the erected position or the stored position;
    wherein the changeover operation section communicates with the electronic control unit when operated by a driver in a changing-over manner between a drive mode operation position and a neutral mode operation position corresponding, respectively, to said drive mode position and said neutral mode position of said electronically driven actuator; and
    wherein the electronic control unit operates the electronically driven actuator based on the changeover operation position of said changeover operation section, and is configured to maintain said electronically driven actuator in said neutral mode position even if said changeover operation section is operated from said neutral mode operation position to said drive mode operation position when a signal received from the sensor of said side stand indicates that the side stand is in said erected position,
    wherein each of the electronic control unit, the mode changeover mechanism, the changeover operation section, and the sensor is mounted on the motorcycle.

2. The mode changeover control system for a transmission in a motorcycle as set forth in claim 1, and further comprising;
    a recognition section receives a and display a signal from electronic control unit in order to enable the driver to recognize whether said electronically driven actuator is in said drive mode position or said neutral mode position.

3. The mode changeover control system for a transmission in a motorcycle as set forth in claim 2, wherein said recognition section includes a mode display unit provided on a meter panel of said motorcycle for displaying the whether said electronically driven actuator is in said drive mode position or said neutral mode position.

4. The mode changeover control system for a transmission in a motorcycle as set forth in claim 1, wherein said electrically driven actuator is operated by an electrical output from said changeover operation section.

5. The mode changeover control system for a transmission in a motorcycle as set forth in claim 1, wherein said electrically driven actuator includes an electric motor,
    wherein the electric motor rotates normally and reversely by an electric current by the controlled by the electronic control unit through a normal/reverse rotation control relay.

6. The mode changeover control system for a transmission in a motorcycle as set forth in claim 1, wherein an operation of said electrically driven actuator does not determine whether the side stand is in the erected position or the stored position.

7. The mode changeover control system for a transmission in a motorcycle as set forth in claim 1, wherein said electronic control unit is configured so as to maintain said electronically driven actuator in said neutral mode position, irrespectively of the position of said side stand, even if said changeover operation section is operated from said neutral mode operation position to said drive mode operation position when a throttle valve is opened to or beyond a predetermined opening.

8. The mode changeover control system for a transmission in a motorcycle as set forth in claim 2, wherein said electronic control unit is configured so as to maintain said electronically driven actuator in said neutral mode position, irrespectively of the position of said side stand, even if said changeover operation section is operated from said neutral mode operation position to said drive mode operation position when a throttle valve is opened to or beyond a predetermined opening.

9. The mode changeover control system for a transmission in a motorcycle as set forth in claim 1, wherein the erected position of the side stand is a downwardly extending position, and the stored position of the side stand is a position that is substantially parallel to a length of the motorcycle.

10. The mode changeover control system for a transmission in a motorcycle as set forth in claim 1,
wherein the electronic control unit judges the positions of the side stand by the signal received from the side stand sensor.

11. A mode changeover control system for a transmission in a motorcycle comprising:
a control section;
a mode changeover mechanism adapted to communicate with the control section and to change over a continuously variable transmission between a drive mode position for establishing a drive mode and a neutral mode position for establishing a neutral mode;
a side stand operatively mounted relative to said motorcycle, said side stand being manually positioned in an erected position for supporting said motorcycle, with a front wheel and a rear wheel in a grounded state, and a stored position for enabling operation of the motorcycle;
a changeover operation section which communicates with the control section and to be manually operated in a changing-over manner between a drive mode operation position and a neutral mode operation position corresponding, respectively, to said drive mode position and said neutral mode position of said mode changeover mechanism; and
a control section for operating said mode changeover mechanism based on the changeover operation position of said changeover operation section,
wherein said control section is configured to maintain said mode changeover mechanism in said neutral mode position even if said changeover operation section is operated from said neutral mode operation position to said drive mode operation position when said side stand is in said erected position, and further comprising:
a recognition section which communicates with the control section and enables a driver to recognize the condition whether said mode changeover mechanism is in said drive mode position or said neutral mode position,
wherein said recognition section includes a mode display unit provided on a meter panel of said motorcycle for displaying the condition where said mode changeover mechanism is in said drive mode position or said neutral mode position,
wherein said mode changeover mechanism comprises an electrically driven actuator with an electric motor that is operated by an electrical output from said changeover operation section,
wherein the electric motor rotates normally and reversely by an electric current controlled by the control section through a normal/reverse rotation control relay,
wherein each of the control section, the mode changeover mechanism, and the changeover operation section, is mounted on the motorcycle.

12. The mode changeover control system for a transmission in a motorcycle as set forth in claim 11, wherein said mode changeover mechanism comprises an electrically driven actuator the operation of which does not determine whether the side stand is in the erected position or the stored position.

13. The mode changeover control system for a transmission in a motorcycle as set forth in claim 11, wherein said control section is configured so as to maintain said mode changeover mechanism in said neutral mode position, irrespectively of the position of said side stand, even if said changeover operation section is operated from said neutral mode operation position to said drive mode operation position when a throttle valve is opened to or beyond a predetermined opening.

14. The mode changeover control system for a transmission in a motorcycle as set forth in claim 11, wherein the erected position is a downwardly extending position, and the stored position is a position that is substantially parallel to a length of the motorcycle.

15. The mode changeover control system for a transmission in a motorcycle as set forth in claim 11,
wherein the side stand includes a side stand sensor adapted to determine whether the side stand is in the erected position or the stored position, and
wherein the control section judges the positions of the side stand by signals received from the side stand sensor.

* * * * *